UNITED STATES PATENT OFFICE.

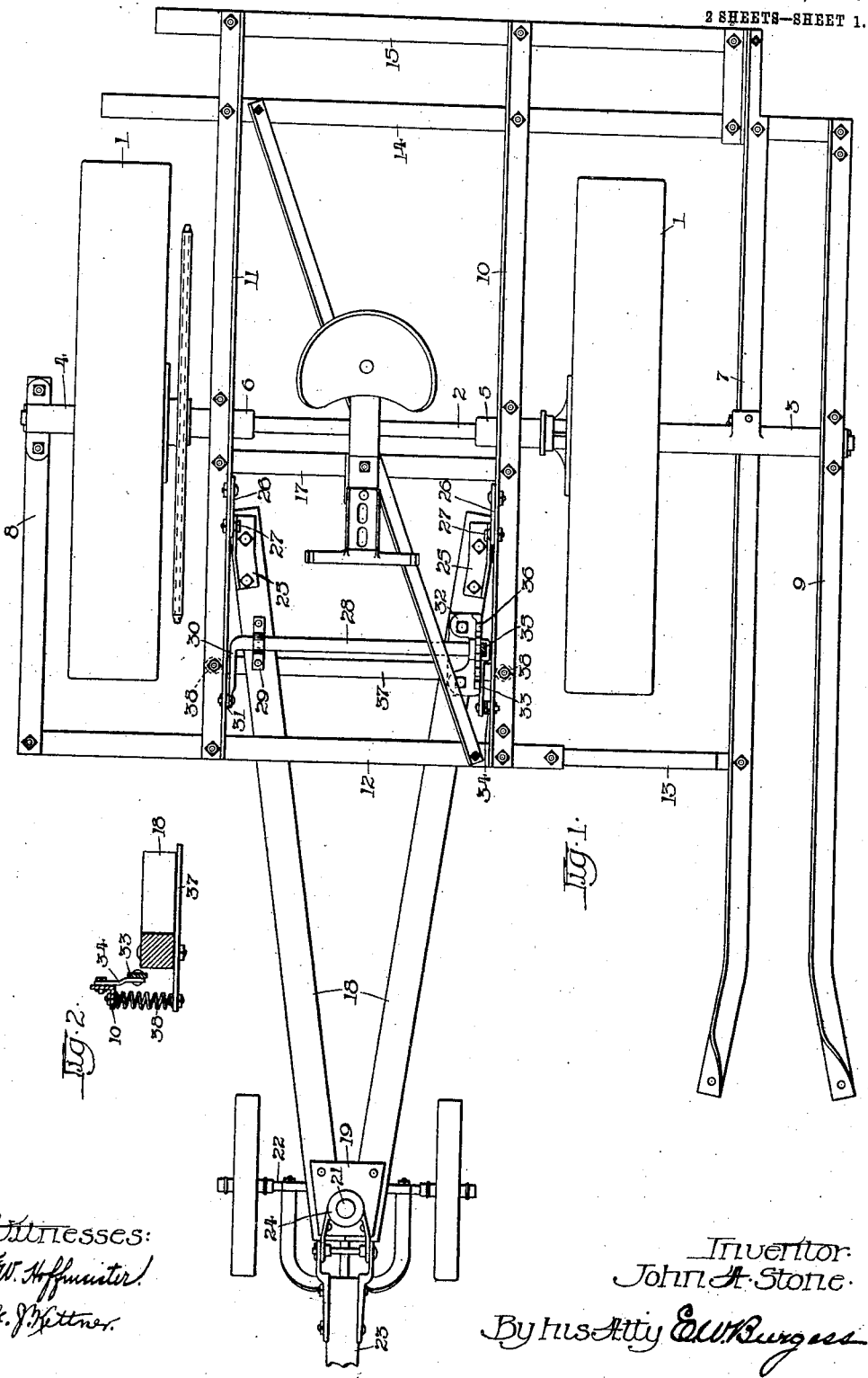

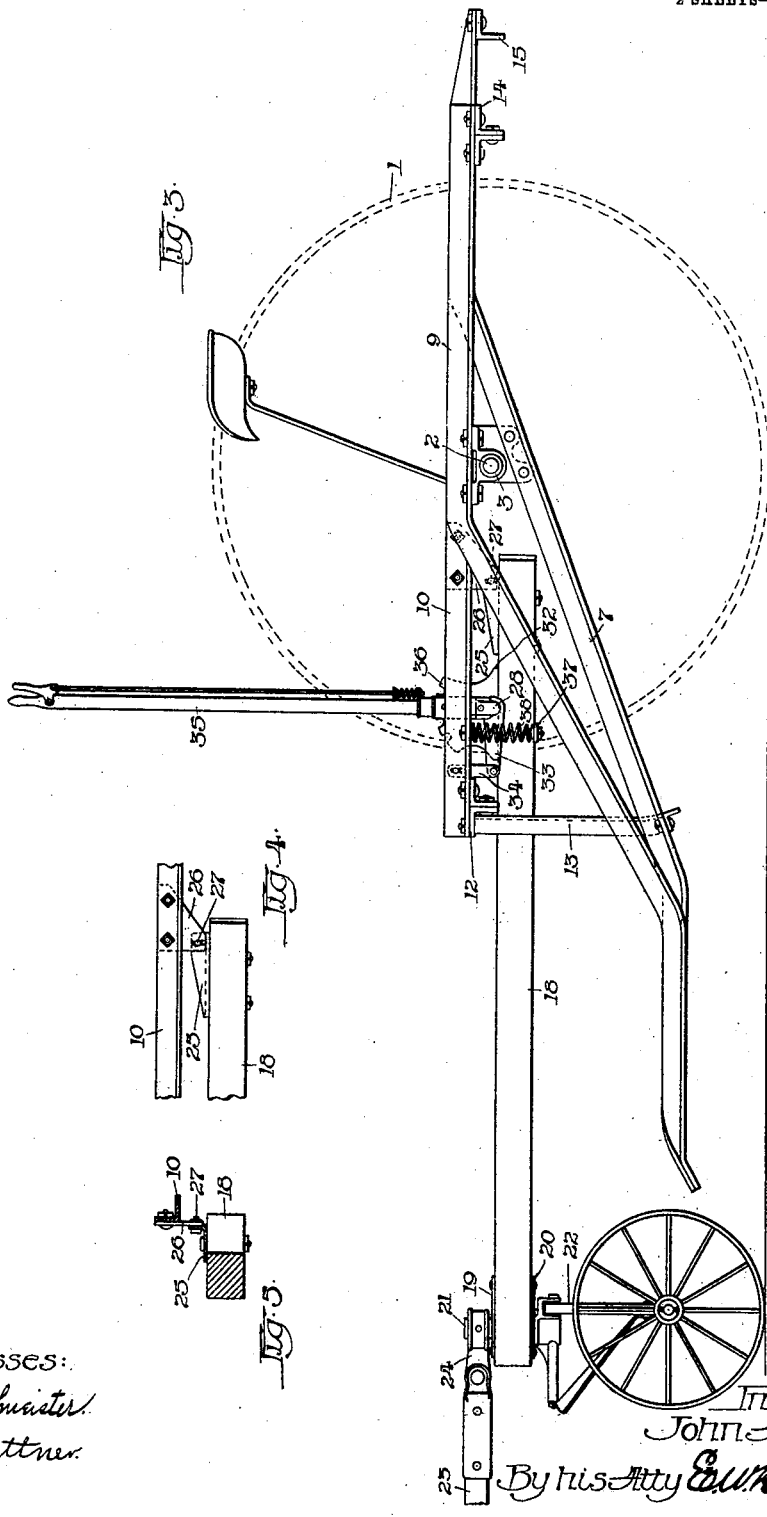

JOHN A. STONE, OF CHICAGO, ILLINOIS, ASSIGNOR TO INTERNATIONAL HARVESTER COMPANY, A CORPORATION OF NEW JERSEY.

CORN-HARVESTER.

No. 925,526.　　　　Specification of Letters Patent.　　　Patented June 22, 1909.

Application filed January 11, 1909.　Serial No. 471,598.

*To all whom it may concern:*

Be it known that I, JOHN A. STONE, a citizen of the United States, residing at Chicago, in the county of Cook and State of Illinois, have invented certain new and useful Improvements in Corn-Harvesters, of which the following is a specification.

My invention relates to corn harvesters, and in particular to the construction of the wheel and draft frames and the manner of connecting the two frames in operative relation, its object being to provide a construction having few parts, simple and strong, and well adapted to meet the requirements of standing the great strains to which this class of machines is subjected. I attain these results by means of the mechanism illustrated by the accompanying drawings, in which—

Figure 1 represents a top plan view of a part of a corn harvester embodying my invention; Fig. 2 is a detached detail of part of the adjusting mechanism between the wheel frame and the draft frame; Fig. 3 is a side elevation of Fig. 1; Fig. 4 is a detached detail of the pivotal connection between the draft frame and the wheel frame; and Fig. 5 is an end elevation of Fig. 4.

The same reference numerals designate like parts throughout the several views.

1 designates the traction and carrying wheels mounted upon an axle 2 journaled in bearings 3 and 4 at the grainward and stubbleward sides of the machine, respectively, and outside the traction wheels, and 5 and 6 represent supplemental bearings for the axle arranged between the carrying wheels.

The wheel frame includes longitudinally arranged bars 7 and 8 outside the wheels and on the grainward and stubbleward side of the machine, respectively, having the bearings 3 and 4 secured thereto.

9 represents a supplemental frame bar which is also secured to bearing 3, with an intervening space between the two bars that forms a passageway for the stalks of corn, and 10 and 11 represent other longitudinally arranged intermediate bars that are secured to bearings 5 and 6, respectively, between the said wheels; the bars 8, 10 and 11 being in a substantially horizontal plane. The frame bars 7 and 9 extend downward and forward from their connection with the axle bearing members, a portion thereof arranged in a plane substantially parallel with the frame members 8, 10 and 11.

12 designates a transversely arranged bar secured to the forward ends of bars 8, 10 and 11, and 13 is a downwardly extending bar having its upper end secured to the grainward end of bar 12 and its lower end to bar 7.

14 is a transversely arranged bar in rear of the wheels and secured to bars 7, 9, 10 and 11 and parallel with bar 14, and in rear thereof is a frame bar 15 secured to bars 7, 10 and 11, and 17 designates a transverse bar arranged in front of the axle and having its opposite end secured to bars 10 and 11.

The draft frame includes two forwardly converging members 18 having plate members 19 and 20 secured to their upper and lower sides, respectively, at their forward ends the plate members being provided with a vertically arranged bearing, in which is journaled a stem 21 forming part of the tongue truck 22, and 23 represents a tongue secured to the upper end of said stem by means of a connecting member 24, to which said tongue is pivotally connected. 25 designates brackets secured to the rear ends of the draft frame members, and 26 represents complemental brackets secured to the frame wheel members 10 and 11 and pivotally connected with the first mentioned brackets by means of pins 27, as shown in Figs. 4 and 5.

A transverse rock shaft 28 is journaled upon the frame members forward of their connection with the wheel frame, and integral with its stubbleward end, outside of a bearing member 29, is a forwardly projecting arm 30 that is connected with the frame member 11 by means of a link 31, the opposite end of the shaft being journaled in a bearing member 32 and having secured thereto a forwardly extending arm 33 that is connected with the frame member 10 by means of a link 34. A hand lever 35 is secured to the rock shaft and is provided with a common form of detent mechanism adapted to engage with a sector 36 forming part of the bearing member 32 in a manner to retain the associated parts in any desired position of adjustment.

A transverse bar 37 is secured to the lower side of the draft frame members 18, the ends thereof extending beyond the frame, and 38 represents compression springs interposed between the bar and wheel frame members 10 and 11 and operative in a manner to counterbalance the weight of the forward end of the wheel frame as the operator manipulates the hand lever to tilt the wheel frame about the axle.

What I claim as my invention, and desire to secure by Letters Patent, is:

1. A corn harvester having, in combination, a wheel frame, an axle and traction wheels mounted thereon, said wheel frame including longitudinal bars arranged parallel with each other and between said traction wheels, bearing boxes secured to said bars intermediate their ends and having said axle journaled therein, transverse frame members secured to said longitudinal members at opposite ends thereof, a draft frame including forwardly converging frame members having their rear ends flexibly connected with said longitudinal wheel frame members forward of said axle, a rock shaft arranged transversely and journaled in bearings upon said draft frame, said rock shaft having forwardly projecting arms at opposite ends thereof, links connecting said arms with said wheel frame, and a hand lever adapted to control the movement of said rock shaft.

2. A corn harvester having, in combination, a wheel frame, an axle and traction wheels mounted thereon, said wheel frame including longitudinal bars arranged parallel with each other and between said traction wheels, bearing boxes secured to said bars intermediate their ends and having said axle journaled therein, transverse frame members at opposite ends thereof, a draft frame including forwardly converging frame members having their rear ends flexibly connected with said longitudinal wheel frame members forward of said axle, a rock shaft journaled transversely upon said draft frame forward of its connection with said wheel frame, said rock shaft having forwardly extending crank arms at opposite ends thereof, links connecting said arms with said wheel frame, a hand lever mechanism adapted to control the movement of said rock shaft, and compression springs interposed between said draft frame and said wheel frame and adapted to counterbalance the weight of the forward portion of the latter.

3. A corn harvester having, in combination, a wheel frame, an axle and traction wheels mounted thereon, said wheel frame including a single longitudinal bar arranged upon the stubbleward side of said traction wheels, and a pair of longitudinal bars arranged upon the grainward side thereof and spaced apart to form a passageway for the corn stalks, said bars having bearing boxes for said axle secured thereto, said pair of frame bars being extended forwardly and downwardly from the bearing boxes for said axle, longitudinal supplemental bars arranged between said traction wheels and having bearings for said axle secured thereto, a transverse frame bar secured to the forward end of said supplemental bars and said stubbleward bar, and a downwardly extending bar having its upper end secured to the grainward end of said transverse bar and its lower end to the bar upon the stubbleward side of said passageway, a transverse bar secured to the rear end of one of said grainward longitudinal bars and said supplemental bars, and a transverse bar secured to said grainward and supplemental bars forward of said last mentioned bar.

JOHN A. STONE.

Witnesses:
R. B. HOSSACK,
A. B. DACK.